United States Patent [19]

McCord

[11] Patent Number: 4,925,139
[45] Date of Patent: May 15, 1990

[54] MECHANICAL STAGE SUPPORT FOR A SCANNING TUNNELING MICROSCOPE

[75] Inventor: Mark A. McCord, Yonkers, N.Y.

[73] Assignee: International Business Machines Corporation, Armonk, N.Y.

[21] Appl. No.: 345,609

[22] Filed: Apr. 28, 1989

[51] Int. Cl.$^5$ ............................................. F16M 11/12
[52] U.S. Cl. ................................... 248/179; 248/183; 248/913
[58] Field of Search ............... 248/913, 178, 179, 183; 33/1 M; 74/479; 108/20; 250/306

[56] References Cited

U.S. PATENT DOCUMENTS

| | | | |
|---|---|---|---|
| 2,869,418 | 1/1959 | Miller et al. | 248/913 X |
| 3,044,354 | 7/1962 | Brösicke | |
| 3,525,140 | 8/1970 | Cachon et al. | 248/913 X |
| 3,801,090 | 4/1974 | Gillen | 248/913 X |
| 3,849,857 | 11/1974 | Murray, Jr. | 248/913 X |
| 3,870,416 | 3/1975 | Brady et al. | 356/138 |
| 3,990,153 | 11/1976 | Calame | 33/1 M |
| 4,077,722 | 3/1978 | Bicskei | 248/913 X |
| 4,157,818 | 6/1979 | Key, Jr. | 269/73 |
| 4,520,570 | 6/1985 | Bednorz et al. | 33/180 R |
| 4,635,887 | 1/1987 | Hall et al. | 248/179 |
| 4,668,865 | 5/1987 | Gimzewski et al. | 250/306 |

FOREIGN PATENT DOCUMENTS

| | | |
|---|---|---|
| 0252174 | 7/1986 | European Pat. Off. |
| 0252745 | 7/1987 | European Pat. Off. |
| 1903380 | 1/1969 | Fed. Rep. of Germany |
| 2469860 | 11/1979 | France |
| 682751 | 5/1977 | U.S.S.R. |
| 2131908A | 11/1983 | United Kingdom |

OTHER PUBLICATIONS

G. Binnig and H. Rohrer, "Scanning Tunneling Microscopy," Physica, Elsevier Science Publishers B.V., vol. 127B, pp. 37-45 (1984).

B. W. Corb, M. Ringger and H. J. Güntherodt, "An Electromagnetic Microscopic Positioning Device for the Scanning Tunneling Microscope," J. Appl. Phys., vol. 58 (11), pp. 3947-3953 (Dec. 1, 1985).

S. I. Park and C. F. Quate, "Tunneling Microscopy of Graphite in Air," Appl. Phys. Lett., vol. 48 (2), pp. 112-114 (Jan. 13, 1986).

D. P. E. Smith and G. Binnig, "Ultrasmall Scanning Tunneling Microscope for Use in a Liquid-helium Storage Dewar," Rev. Sci. Instrum., vol. 57 (10), pp. 2630-2631 (Oct. 1986).

M. A. McCord and R. F. W. Pease, "A Scanning Tunneling Microscope for Surface Modification," Journal de Physique, vol. 47, pp. C2-485-C2-491 (Mar. 1986).

J. E. Demuth, R. J. Hamers, R. M. Tromp and M. E.
(List continued on next page.)

Primary Examiner—Ramon O. Ramirez
Attorney, Agent, or Firm—Bernard E. Shay

[57] ABSTRACT

The present invention is an improved mechanism for the coarse adjustment of a scanning tunneling microscope stage. In the present invention the stage is moved by forces transmitted through rigid wire springs mounted on leaf spring assemblies which transmit the motion from rigidly mounted micrometer adjusting devices. It is intended that the coarse adjustment mechanism of the present invention will provide improved performance over coarse adjustment mechanisms presently available for STM applications.

The present invention replaces separate sets of leaf springs for X and Y motion with a single set of four wire springs. This simplifies the design and increases the rigidity and stability by reducing the mechanical path length from the solid base to the X-Y-Z stage. The screw mechanisms are all directly connected to the rigid base. (This is made possible by the additional pairs of wire springs connected from the X and Y screws to the stage.) The following advantages are achieved: first, since the screw mechanisms do not move with the stage, driving mechanisms such as motors and gears can be simply connected; and, second, the rigidity and stability are again increased since the stage position is referenced directly to the base through all three screws rather than through intermediate support structures.

13 Claims, 2 Drawing Sheets

OTHER PUBLICATIONS

Welland, "A Simplified Scanning Tunneling Microscope for Surface Science Studies," J. Vac. Sci. Technol., vol. A4 (3), pp. 1320–1323 (May/Jun. 1986).

B. Michel and G. Travaglini, "An STM for Biological Applications: Bioscope," Third International Conference on Scanning Tunneling Microscopy, Oxford, England (Jul. 4–8, 1988).

J. Aronstein and L. W. Holmstrom, "Frictionless X, Y, Z and Theta Micro-Positioning Table," IBM Technical Disclosure Bulletin, vol. 15, No. 12 (5/73).

C. V. Rabstejnek, "Step and Repeat Micropositioning Table," IBM Technical Disclosure Bulletin, vol. 12, No. 11 (4/70).

U. H. Bapst, "Automated Scanning Tunneling Microscope," Surface Science, vol. 181, pp. 157–164 (1987).

MECHANICAL STAGE SUPPORT FOR A SCANNING TUNNELING MICROSCOPE

The present invention relates, in general, to an apparatus for controlling the gross movements of a scanning tunneling microscope stage and, more particularly, to an arrangement wherein the scanning tunneling microscope stage is rigidly affixed to a support structure through axially rigid wire springs.

BACKGROUND OF THE INVENTION

Scanning tunneling microscope stages are generally adapted to locate a sample under the microscope needle. Since the tolerances for accurately locating samples are extremely small, the stage location is generally adjustable in both fine and coarse increments. Fine adjustments are used to position the sample precisely with respect to the scanning needle, such that the region of the sample to be scanned is located a predetermined distance from the needle and directly thereunder. The coarse adjustment mechanism is designed to allow access to the sample. Once the sample has been placed on the STM stage, the coarse adjustment mechanism moves the stage to a location where fine adjustment may be used to accurately position the sample under the needle. Fine adjustment is usually accomplished by adjusting the needle position.

Previous stage designs for the scanning tunneling microscope have relied on piezoelectric or magnetic stepping devices for coarse adjustment. The article, "An Electromagnetic Microscopic Positioning Device for the Scanning Tunneling Microscope," by Corb et al., *J. Appl Phys.*, 58 (11), December 1985, describes a magnetic coarse positioning apparatus. Designs which have relied on piezoelectric or magnetic stepping devices, while providing the necessary mechanical rigidity, have provided only limited motion in just one or two dimensions. Other gross adjustment designs based upon mechanical motion utilize leaf spring, sliding apparatus or a combination of leaf spring and sliding apparatus. While providing the necessary mechanical rigidity, both of these arrangements have limitations. They provide only limited motion, they are unreliable, they are sensitive to environmental conditions (e.g., dust), and their movements generally lack repeatability.

In some prior art designs, for example, the apparatus described in Russian Patent Document No. 682751, position adjustment is accomplished using screw mechanisms to slide a support structure. Designs of this type are sensitive to environmental conditions. For example, dust will tend to cause non-linear and non-repeatable motions. Also, sliding apparatus tend to have backlash problems since the friction of the slide points will tend to prevent the stage portion from moving freely.

U.S. Pat. No. 4,635,887 describes an alternative stage adjustment mechanism. In this patent, the adjustment screws are mounted to move with a series of intermediate support structures to provide three dimensional movement to an external stage. The supporting walls for the flexible springs are floating. The final stage position is connected to the main stage (frame) through a long mechanical path including a series of bending members. This arrangement is disadvantageous because it reduces immunity from vibration, position accuracy and thermal stability.

*IBM Technical Disclosure Bulletin*, Vol. 15, No. 12, May 1973, "Frictionless X, Y, Z and Theta Micropositioning Table," by Aronstein and Holmstrom, describes a micropositioning table utilizing piezoelectric supports which are flexible in a first direction, while being rigid in a support direction 90 degrees perpendicular to the flexible direction. These supports are used to mount a moveable stage. The gross positioning achievable using this arrangement is limited in range because it is piezoelectric driven. In addition, it is susceptible to vibration due to the nature of the mounting. Finally, the separate bending supports are not referenced to a fixed frame.

In "An STM for Biological Applications: BIOSCOPE" by B. Michel and G. Travaglini, presented at the Third International Conference on Scanning Tunneling Microscopy, Oxford, U.K., July 4-8, 1988, three-dimensional coarse motion is achieved using a sliding stage which requires three precision machined and polished sapphire plates. The micrometers slide diagonally cut blocks with sapphire interfaces to obtain X, Y and Z motion. Again, the sliding motion makes this device sensitive to environmental conditions.

Since the invention of the scanning tunneling microscope (STM) by Binnig and Rohrer (See "Scanning Tunneling Microscopy," *IBM J. Res. Develop.*, Vol. 30, pp. 355-369, 1986.), coarse positioning of the sample has remained an unresolved problem. The large size of conventional X-Y-Z stages and the three degrees of freedom required result in inherent thermal and mechanical instabilities. Thus measurements must compensate for vibrations and thermal drift. A disadvantage of coarse positioning systems which are limited to two directions (X and Y-directions) is poor access of the tip to the sample. Further, if positioning is performed with piezoelectric elements, direction and magnitude of the movements are unpredictable. Finally, because most coarse positioning systems are manually operated, they cannot be controlled from data acquisition software.

Another problem with conventional positioning systems is the failure to reference all movements directly to a fixed support structure. The adjusting mechanisms in all three dimensions should be referenced directly to a fixed support structure to achieve the accuracy required in STM applications.

Another problem involves the adaptation of STM technology to biological applications; up to now most applications of STM have dealt with small repetitive structures that could be found within the range of a piezoelectric fine positioner. In such applications an unreliable, rough positioning system was not a great disadvantage. However, in biological applications, where structures are much less dense or even unique, the chance of locating a particular feature within the range of the piezoelectric fine positioner is very low.

Thus it will be seen that an improved coarse adjustment mechanism would include a reliable apparatus for moving the stage in relatively large steps. Such a mechanism would further include means for accurately and repeatably moving the stage to within a predetermined distance of the STM needle, where the predetermined distance is sufficiently small to allow the fine adjustment mechanism to work. Such a mechanism would further include a means to connect the stage to a rigid base in order to reduce the transmission and amplification of vibrations. In addition, such an apparatus would include means to adapt the coarse adjustment to a mechanized adjustment means with a minimum of interconnect apparatus. Finally, such an apparatus would not include sliding means.

The present invention allows very precise mechanical X, Y and Z motion of the sample in a scanning tunneling microscope while maintaining the instrument's immunity to external vibrations. In addition, the present invention provides a relatively large range of motion in three dimensions.

SUMMARY OF THE INVENTION

Here, an STM with an improved coarse positioning system and a large scan area is presented. With this apparatus it is possible to locate areas of interest on a large sample within a short period of time.

The present invention is an improved mechanism for the coarse adjustment of a scanning tunneling microscope stage. In the present invention the stage is moved by forces transmitted through rigid wire springs mounted on leaf spring assemblies which transmit the motion from rigidly mounted micrometer adjusting devices. It is intended that the coarse adjustment mechanism of the present invention will provide improved performance over coarse adjustment mechanisms presently available for STM applications.

More particularly, the present invention is an apparatus for the adjustment of a stage support structure such as an STM stage comprising a first set of, for example, four axially rigid support members, for example, wire springs, which are connected to one face of the stage. The support members are rigidly mounted perpendicular to the face of the stage. The ends of the support members opposite the stage member are rigidly attached to a first spring arrangement, for example, a leaf spring. The first spring arrangement is firmly affixed on or parallel to a first wall of the support structure. A second wall of the support structure is mounted perpendicular to the first wall and parallel to the first set of support members. The second wall supports a second spring, for example, a leaf spring, connected by a second set of rigid support members to one side of the stage member. A third wall of the support structure is mounted perpendicular to both the first and second sides and parallel to the first set of support means. The third wall supports a third spring, for example, a leaf spring, connected by a third set of support members to a side of the stage member perpendicular to the side connected to the second set of support members. Screw mechanisms, for example, micrometers, are connected to each of the three walls such that an adjustment of a screw mechanism causes motion in the leaf springs which is transmitted through the rigid support members to the stage.

In an alternate embodiment of the present invention, an additional set of support members is connected to the face of the stage member opposite the face to which the first set of support members are connected. The ends of the fourth set of support members not connected to the stage member are connected to a spring, for example, a leaf spring, mounted on or parallel to a fourth wall of the support structure which is parallel and opposite the first wall and perpendicular to the second and third walls.

In a further embodiment of the present invention, fourth, fifth and sixth sets of micrometer screws are mounted in walls of the support structure opposite the first, second and third walls, respectively. The fourth, fifth and sixth micrometer screws contact fourth, fifth and sixth leaf springs mounted on the fourth, fifth and sixth walls, respectively. Fourth, fifth and sixth leaf springs contacting fourth, fifth and sixth axially rigid support members are mounted to the stage on a side of the stage opposite the first, second and third axially rigid support members, respectively. Thus, for example, movement in a first direction by adjusting the first micrometer screw is opposed by the combination of the fourth micrometer screw, the fourth leaf spring and the fourth axially rigid member. Motion in the second and third directions is likewise opposed by the opposite set of micrometer screws, leaf spring and axially rigid supports.

It is an object of the present invention to provide an apparatus adapted to Provide coarse adjustment of a scanning tunneling microscope stage.

It is a further object of the present invention to provide a coarse adjustment mechanism which reduces the vibration transmitted to the stage.

It is a further object of the present invention to provide a coarse adjustment mechanism including axially rigid springs which support the stage member and transmit motion from a screw mechanism to the stage.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

The present invention is directed to an apparatus for controlling gross movements of the STM stage itself, fine adjustments of the STM needle would be accomplished by, for example, the piezoelectric drive as illustrated in FIG. 1C on page 38 of the article by Binnig et al., entitled, "Scanning Tunneling Microscopy" *Physica*, Elsevier Science Publishers, B.V. (127B), 1984, which is hereby incorporated by reference. Alternatively known piezoelectric tube designs may be used to position the STM needle.

Figure 1:
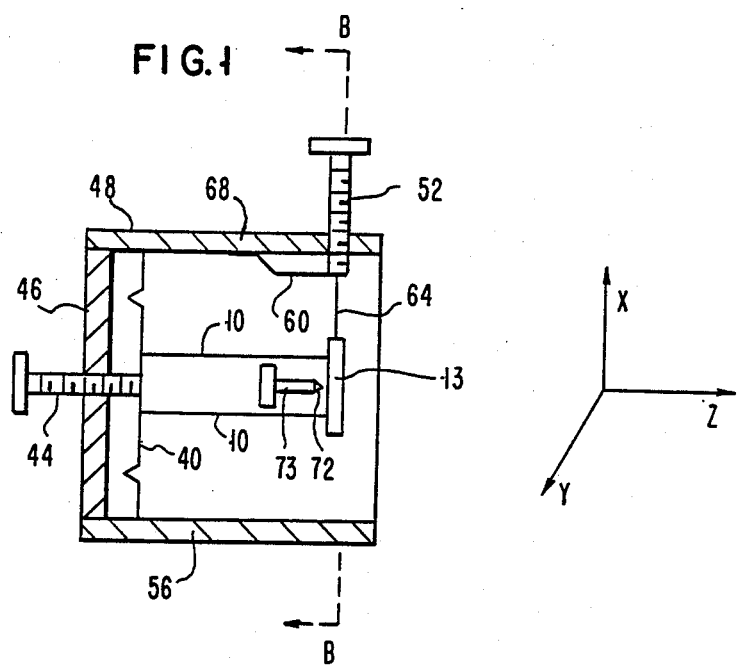
FIG. 1 illustrates a cutaway view along A—A in FIG. 2 of one embodiment of a support structure and coarse adjustment mechanism according to the present invention.

A cutaway drawing of the mechanical stage according to one embodiment of the present invention, including the scanning tunneling microscope needle 72 and piezoelectric tube 73, is shown in FIG. 1. The sample stage 13 is connected by first wire springs 10 to leaf spring 40 which is actuated in the Z direction by first micrometer screw 44. It will be recognized that micrometer screw 44 may suitably be replaced by any linear positioning device providing motion in a direction parallel to the axially rigid support members, for example, hydraulic pistons or piezoelectric crystals. Wire springs 10 preferably comprise four straight wires which are rigid in the axial direction but flexible in the lateral direction. However, any support member which is rigid along a main axis and flexible perpendicular to the main axis may be suitable for this purpose, for example, a member with a circumferential or even oval cross-section. Micrometer screw 44 is threaded through main wall 46 of support frame 48. A second micrometer screw 52 may be added to first side wall 68 to control stage motion in the X direction. Second micrometer screw 52 rests against second leaf spring 60, which is connected to sample stage 13 through second wire springs 64. It will be noted that second micrometer screw 52 may just as easily be added to second side wall 56 without changing the operation of the support structure.

Figure 2:
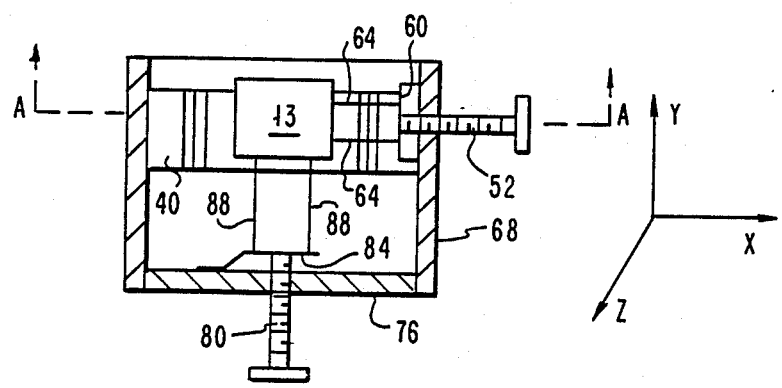
FIG. 2 illustrates a cutaway view of the embodiment of FIG. 1 along B—B thereof.

FIG. 2 illustrates a second cutaway view of the embodiment of FIG. 1 showing third side wall 76. Third side wall 76 includes third micrometer screw 80 and third leaf spring 84. Third micrometer screw 80 moves sample stage 13 in the Y direction by pressing against third leaf spring 84, which is attached to sample stage 13 through wire springs 88. Wire springs 64 and 88 preferably comprise a pair of wires which are rigid in the axial direction and flexible in the lateral direction. However, any suitable member such as those described when discussing wire springs 10, may be used.

Figure 3:
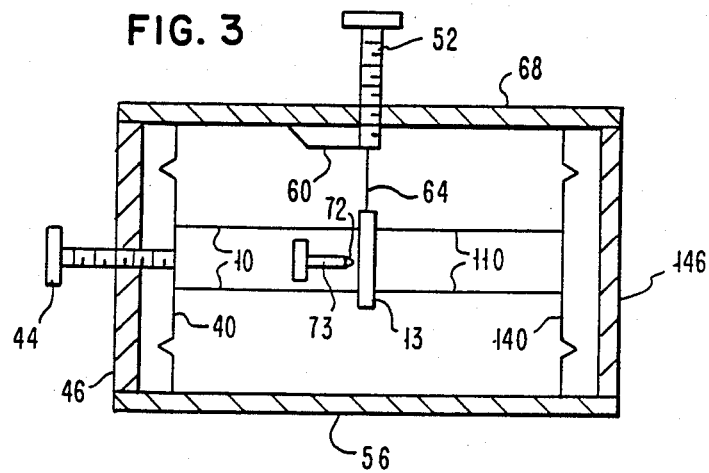
FIG. 3 illustrates a cutaway view of a second embodiment of a support structure and coarse adjustment mechanism according to the present invention.

FIG. 3 illustrates a further embodiment of the present invention including fourth leaf spring 140 and fourth wire springs 110. In this embodiment, fourth leaf spring 140 opposes movement of stage 13 in the Z direction, thus damping movement by the first micrometer and improving the accuracy and repeatability of the stage motion.

As the apparatus becomes more symmetrical, it is expected that it will become more linear and immune to vibration and thermal drift. Therefore, it will be readily apparent to those of skill in the art that an alternative embodiment, not illustrated, could include opposing micrometers, leaf springs and axially rigid support members for each of the directions of motion X, Y and Z. The opposing micrometers would be mounted opposite the micrometers illustrated in FIGS. 1-3. Further preferred embodiments, also not shown, could include opposing micrometer, leaf spring and axially rigid support member combinations for one or two of the directions X, Y and Z. For example, a micrometer screw 144 could be mounted on or parallel to wall 146 of FIG. 3. Motion of a micrometer screw mounted in wall 146 would be transmitted through spring 140 to fourth wire springs 110, and would tend to move stage 13 in a direction opposite the direction micrometer screw 44 moves stage 13. Thus, this additional combination of micrometer screw, leaf spring and wire spring would tend to oppose motion of the stage caused by micrometer screw 44, leaf spring 40 and axially rigid supports 10. It will be apparent that such an arrangement will work best when opposing micrometer screws are synchronized to ensure that they move together. While such modifications may constitute improvements, they do not depart from the scope of the invention claimed in the present application.

Figure 4:
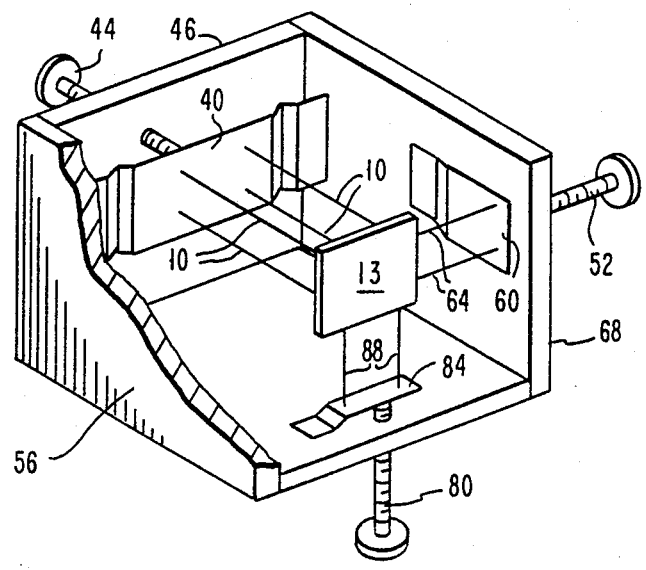
FIG. 4 illustrates a cutaway perspective of the support structure and coarse adjustment mechanism of FIGS. 1 and 2.

FIG. 4 illustrates a cutaway view of the embodiment of the present invention illustrated in FIGS. 1 and 2. In FIGS. 1-3 each of the leaf springs may preferably be strips of sheet metal bent at the points illustrated. The bends in leaf spring 40 are designed to ensure that the center section of leaf spring 40 remains parallel to main wall 46 as the Z micrometer is moved in and out. Alternatively, the center of leaf spring 40 may be strengthened using a stiff metal plate or other stiffener to prevent bending. The ends of leaf spring 40 are firmly affixed to first and second walls 56 and 68 (alternatively the ends of leaf spring 40 may be affixed to main wall 46). Wire springs 10 are wires which hold stage 13 at a fixed distance from the center section of leaf spring 40. These wires may bend in the X and Y directions. Wire springs 64 hold stage 13 at a fixed distance from the portion of second leaf spring 60 which overlies micrometer 52. Wire springs 88 hold stage 13 at a fixed distance from the portion of leaf spring 84 which overlies micrometer 80.

It will be apparent that the leaf springs of the present invention are designed to provide return force and hold the axially rigid support members firmly to the micrometer screw. Thus, any suitable force transmission arrangement for accomplishing this objective would be within the scope of the present invention. For example, the leaf spring may be replaced by means for rotatably attaching the axially rigid support members to the micrometer such that the axially rigid support members do not turn with respect to the stage when the micrometer screw is turned.

As long as the stage motions are small relative to the length of the axially rigid support members (which is normally the case with the STM), the X, Y and Z motions are substantially linear and orthogonal. For larger displacements the stage moves in an arc whose radius corresponds to the length of the axially rigid support members. As the stage moves in X or Y, it moves slightly in Z as well; &he motion is approximately a circular arc. However, even in longer motions, the stage remains perpendicular to the STM needle because the axially rigid support members 10 have a constant length. Thus, the stage is maintained perpendicular to the STM needle even over long movements.

One unique feature of the present invention is that the stage is coupled to the X, Y and Z micrometer drivers through straight wire springs that are stiff in the direction of travel, but flexible in the other two dimensions. In addition, by using bending parts, the stage support is very small, light and mechanically rigid. This reduces relative vibrations between the scanning tunneling microscope and the stage to the sub-angstrom level, allowing high quality tunneling images to be obtained. To reduce the absolute vibrations the base to which the stage and the STM are mounted is usually supported by an elaborate set of springs or rubber vibration mounts. To reduce relative vibrations both the STM and the stage must be rigidly connected to the base, which the present invention allows.

In one embodiment, the STM was designed so that the stage could hold a 1-inch wafer. The other major design objective was that, for a 1 mm movement in X or Y, the motion in Z be less than 3 micrometers, which is the range of the STM. To achieve these objectives, it was found that wire springs should be at least 1.5 inches long. In this embodiment, 1.75 inch wire springs were used. The diameter and thickness of the springs were chosen as thick as possible to maximize the rigidity of the design while keeping the forces needed to move the stage within the limits of small stepper motors. In this preferred embodiment, the leaf springs are 0.012 inch stainless steel sheet, the mainwire springs are 0.031 inch steel spring wire, and the wire springs connecting the X and Y screws are 0.009 inch steel spring wire.

In order to more readily understand the present invention, its operation may be described in a known STM. An appropriate STM arrangement is described in, "An STM for Biological Applications: BIO-SCOPE," by B. Michel and G. Travaglini, Third International Conference on Scanning Tunneling Microscopy, Oxford, U.K. July 4–8, 1988, which is hereby incorporated by reference. Three stepper motors are used to move stage 13 in the X, Y and Z directions by turning micrometers 44, 52 and 80. Movements of motor axes would normally be geared down to drive micrometer screws 44, 52 and 80. The micrometer spindles are driven by stepper motors by means of the axes and gears. Movement of stepper motors may be damped so that a quasi-constant movement of the coarse positioning system is achieved.

In the present invention, high stability against thermal drift and vibrations is achieved by a rigid and symmetrical design. During high resolution scanning the drives may be decoupled from the micrometers which avoids bypassing the damping stages (four metal plates with viton rods in between) below the main body.

FIG. 2 of the previously referenced article, "An STM for Biological Applications: BIOSCOPE," shows a scheme for implementing data acquisition and the stepper motor control electronics suitable for use with the present invention. The stepper motors are controlled from the CPU via a digital I/O interface and stepper motor driver circuits. Using this arrangement, movements in three axes can be performed with user-definable speeds and step sizes.

The present invention may be seen as a significant improvement because it simplifies the structure and increases the rigidity and stability of the stage, resulting in lower vibrations and greater thermal stability. These improvements are achieved by reducing the mechanical path length from a solid base to the stage. In addition, the screw mechanisms are all directly connected to the rigid base. Since the screw mechanisms do not move with the stage, driving mechanisms such as motors can be connected without complicated gearing arrangements. The rigidity and stability are improved because the stage position is referenced directly to a rigid base rather than through some intermediate stage. The rigid axial support members also improve reliability by replacing sliding members and repeatability by replacing walking members. Therefore, the present invention provides an improved coarse positioning system and a large scan area (i.e., the area of a sample which may be conveniently scanned by the STM).

While preferred embodiments of the present invention have been shown and described herein, it will be obvious to those skilled in the art that such embodiments are provided by way of example only. Numerous variations, changes, and substitutions will now occur to those skilled in the art without departing from the invention. It will also be apparent to those skilled in the art that the present invention is not limited to STM applications, but maY be used in a number of situations including as a stage support for related microscopy techniques including atomic force microscopy. Accordingly, it is intended that the invention be limited only by the spirit and scope of the appended claims.

What we claim is:

1. A simplified apparatus for adjusting the position of a stage in a first direction comprising:
    a stage;
    a rigid support structure;
    a plurality of axially rigid supports having first and second ends;
    said plurality of axially rigid supports being attached to said stage at said first ends of said axially rigid supports and supporting said stage;
    a first spring means including first and second ends;
    said second ends of said axially rigid support being rigidly attached to said first spring means;
    said first and second ends of said first spring means being rigidly attached to said rigid support structure; and
    a first screw mechanism contacting said first spring means and movably attached to said rigid support structure.

2. An apparatus according to claim 1 wherein:
    said plurality of axially rigid supports comprise at least four supports;
    said plurality of axially rigid supports support said stage at at least the corners of a face of said stage;
    said first spring means comprises a leaf spring including a center portion and two end portions; and
    said first screw mechanism is movable in a plane parallel to said axially rigid supports.

3. An apparatus according to claim 1 wherein:
    said first axially rigid support members are attached to said center portion of said first spring means; and
    said first spring means is bent in two places outside said center portion.

4. An apparatus according to claim 1 further including means for adjusting said stage in second direction wherein said first and second directions are mutually orthogonal, said means comprising:
    first and second mutually orthogonal walls of said support structure wherein said first screw mechanism is movably attached to said first wall of said support structure and said first wall of said support structure is in a plane parallel to said center portion;
    second spring means having first and second ends, said second end of said second spring means being attached to said second wall of said support structure;
    second screw mechanism contacting said second spring means between said first and second ends and being movably attached to said second wall of said support structure;
    a second plurality of axially rigid supports having first and second ends wherein said first ends of said axially rigid supports are attached to said first end of said second spring means; and
    a second face of said stage orthogonal to said first face of said stage, said second ends of said second axially rigid support members attached to said second face of said stage.

5. An apparatus according to claim 4 wherein:
    said second spring means comprises a leaf spring;
    said second plurality of axially rigid supports comprising at least two axially rigid supports; and
    said axially rigid supports comprise wire springs having a circumferential cross-section and an axis running parallel to said second direction.

6. An apparatus according to claim 4 further including means for adjusting said stage in a third direction wherein said first, second and third directions are mutually orthogonal, said means comprising:
    a third wall of said support structure orthogonal to said first and second walls;
    third spring means having first and second ends, said second end of said third spring means being attached to said third wall of said support structure;

a third screw mechanism contacting said third spring means between said first and second ends and being movably attached to said third wall of said support structure;

a third plurality of axially rigid supports having first and second ends wherein said first ends of said third axially rigid supports are attached to said first end of said third spring means; and a third face of said stage orthogonal to said first and second faces of said stage, said second ends of said third axially rigid support members attached to said third face of said stage.

7. An apparatus according to claim 6 wherein:

said second and third spring means comprise leaf springs;

said second and third plurality of axially rigid supports comprising at least two axially rigid supports; and said axially rigid supports comprise wire springs having a circumferential cross-section and an axis running parallel to said third direction.

8. A simplified apparatus for adjusting the position of a stage in first, second and third mutually orthogonal directions comprising:

said stage including four corners;

four axially rigid supports supporting said stage at said corners of a face of said stage;

a first leaf spring attached to the ends of said supports opposite said stage;

at least one end of said leaf spring being rigidly attached to a holder; and a screw mechanism being movably attached to said holder, parallel to said rigid supports, such that said screw mechanism presses against said first leaf spring.

9. The apparatus of claim 8 wherein:

said first leaf spring is bent in two places to ensure that a center portion of said leaf spring is maintained substantially parallel to a wall of said holder which includes said screw mechanism.

10. The apparatus according to claim 8 further including a second and third leaf spring, wire spring combination, wherein:

said wire springs separate said leaf springs from the sides of said stage and hold said stage rigidly in the X and Y directions; and said second and third lea springs being rigidly affixed at one end to separate walls of said fixture.

11. An apparatus for the adjustment of a stage support structure such as an STM stage comprising:

a first set of axially rigid support members having first and second ends;

said first ends of said support members connected to one face of said stage;

said first set of support members being mounted perpendicular to said one face of said stage;

said second ends of said first set of support members being rigidly attached to a first spring arrangement;

said first spring arrangement being firmly affixed to said support structure;

a second wall of said support structure being perpendicular to said first wall and parallel to said first set of support members;

said second wall supporting a second spring arrangement connected by a second set of support members to a side of said stage orthogonal to said one face of said stage;

a third wall of said support structure perpendicular to both said first and second walls and parallel to said first set of support members;

said third wall supporting a third spring arrangement connected by a third set of support members to a side of said stage member perpendicular to said side connected to said second set of support members; and force transmission means connected to each of said three walls and contacting said spring arrangement such that an adjustment of one of said force transmission means causes motion in said spring arrangements which is transmitted through said rigid support members to said stage.

12. An apparatus according to claim 11 further comprising:

A fourth set of support members having first and second ends connected to a second face of said stage member opposite said face to which said first set of support members are connected;

a fourth wall of said support structure parallel and opposite said first wall and perpendicular to said second and third walls; and a fourth spring arrangement mounted on said fourth wall of said support structure and contacting said second ends of said fourth set of support members.

13. An apparatus according to claim 12 wherein:

said support members comprise rigid wire springs;

said force transmission means comprise micrometers; and said spring members comprise leaf springs.

* * * * *